US007334983B2

(12) United States Patent
Alvanos et al.

(10) Patent No.: US 7,334,983 B2
(45) Date of Patent: Feb. 26, 2008

(54) INTEGRATED BLADED FLUID SEAL

(75) Inventors: Ioannis Alvanos, West Springfield, MA (US); Rajendra Agrawal, South Windsor, CT (US); Gregory E. Reinhardt, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/260,357

(22) Filed: Oct. 27, 2005

(65) Prior Publication Data

US 2007/0098545 A1 May 3, 2007

(51) Int. Cl.
*F01D 11/02* (2006.01)
(52) U.S. Cl. .................. 415/115; 415/199.5; 416/193 A
(58) Field of Classification Search ............. 415/199.5, 415/173.5, 174.5, 115; 416/193 A, 196 R
See application file for complete search history.

(56) References Cited

U.S. PATENT DOCUMENTS 3,761,200 A * 9/1973 Gardiner ................. 416/220 R 6,189,891 B1 * 2/2001 Tomita et al. .............. 277/414
6,499,945 B1 * 12/2002 Lathrop .................. 416/198 A
7,044,710 B2 * 5/2006 Naik et al. ............... 415/174.4
7,121,791 B2 10/2006 Friedl et al. ............. 415/174.5

FOREIGN PATENT DOCUMENTS

EP 1 512 841 A2 3/2005

* cited by examiner

*Primary Examiner*—Ninh H. Nguyen
(74) *Attorney, Agent, or Firm*—Colin L. Cini

(57) ABSTRACT

Disclosed are various embodiments of a gas turbine blade to vane interface seal for restricting leakage of cooling air and improving the apportioning of the cooling air to the seal. Accordingly, a turbine rotor contains a first and a second stage of radially extending and circumferentially distributed blades. The stages are separated axially from one another by an annular coupling located radially inboard of the blades, forming a chamber therebetween. Interposed between the blade stages is a vane stage. The vane stage contains a land, facing radially inwardly. A ring projects axially from each of the first and second blade stages towards the vane stage. A ring may also project radially from the coupling towards the vane stage. The rings radially cooperate with the land and together form the blade to vane interface seal. The coupling contains an aperture for radially introducing a cooled fluid to the chamber for use in cooling the seal.

23 Claims, 6 Drawing Sheets

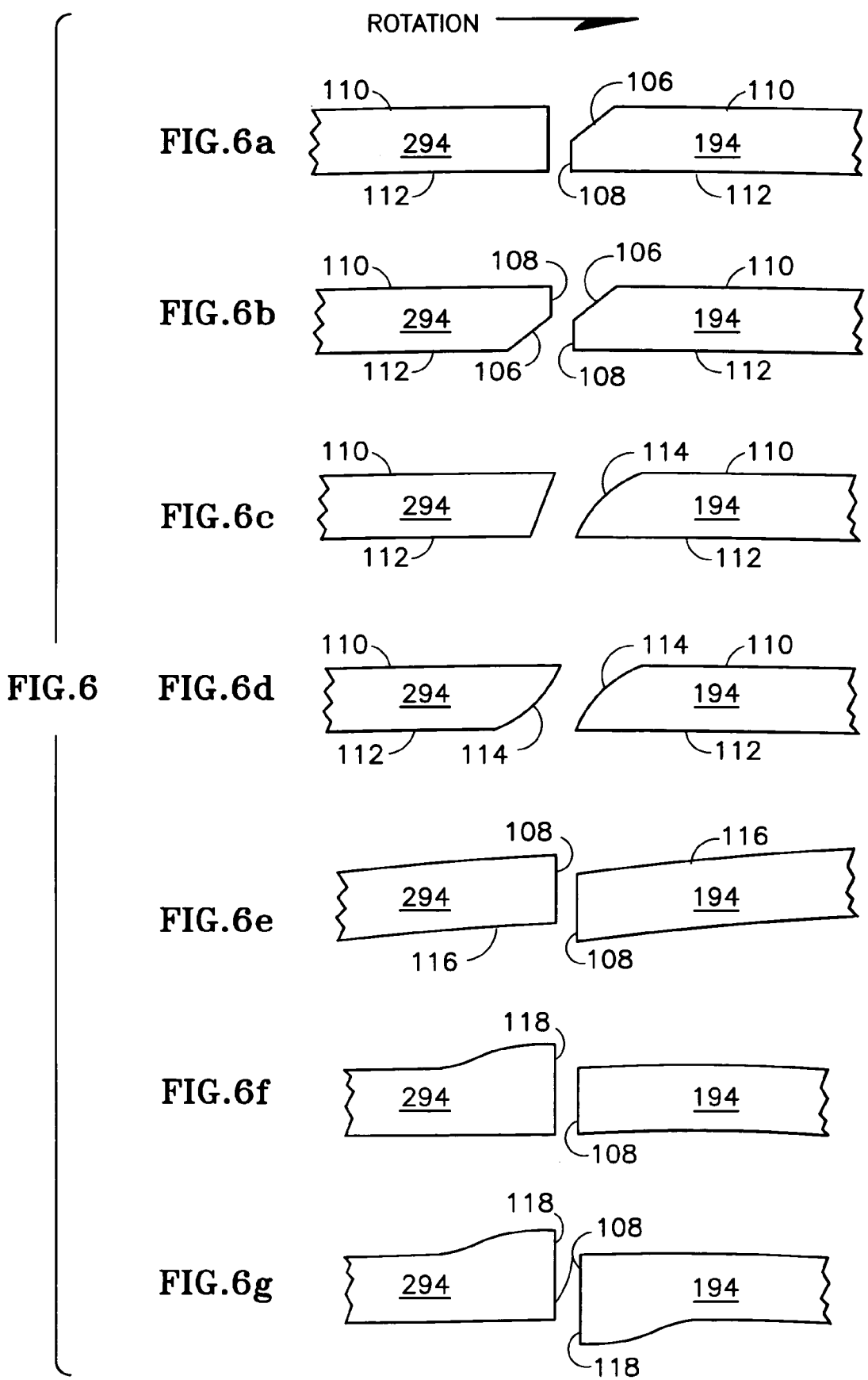

INTEGRATED BLADED FLUID SEAL

CROSS-REFERENCE TO RELATED APPLICATIONS

This application discloses subject matter related to copending U.S. patent applications "HAMMERHEAD FLUID SEAL" (Ser. No. 11/146,801), "COMBINED BLADE ATTACHMENT AND DISK LUG FLUID SEAL" (Ser. No. 11/146,798) and "BLADE NECK FLUID SEAL" (Ser. No. 11/146,660), each filed on Jul. 7, 2005.

BACKGROUND OF THE INVENTION (1) Field of the Invention

The invention relates to gas turbine engines, and more specifically to a cooled fluid sealing arrangement disposed between blades and vanes of such engines.

(2) Description of the Related Art

Gas turbine engines operate by compressing ambient air with a forward compressor, injecting a fuel, burning the air-fuel mixture in a central combustor and converting the energy of combustion into a propulsive force. Combustion gases exit the combustor through an annular duct, where the gases drive one or more axial stages of circumferentially distributed turbine blades. Each bladed stage transfers the combustion gas energy to a rotor attached to a central, longitudinal shaft. Interposed with the rotating blade stages are stationary vane stages affixed to radially outer casing structures, circumscribing the rotor. Two or more rotors may operate independently of one another and at differing speeds via concentric shafts. Gas turbine engines are flexible power plants that are typically used for powering aircraft, ships and generators.

In order to withstand combustion gas temperatures that regularly exceed 2000 degrees Fahrenheit and pressures exceeding 400 pounds per square inch absolute, turbine components such as blades, vanes and seals are cooled with lower-temperature, higher-pressure cooling air. The cooling air is bled from the compressors, then directed axially rearward and radially inward of the rotors to the turbine components, bypassing the combustor altogether. Once delivered to the turbine, a significant portion of the cooling air is directed radially outward to the blades, vanes and seals by the centrifugal force of the turning rotors. In order to achieve the greatest heat reduction benefit from the cooling air, the interfaces of the rotating blade stages and stationary vane stages must be effectively sealed.

The interfaces of the rotating blade stages and stationary vane stages are particularly difficult to seal due to the differences in thermal and centrifugal growth between the rotors and the cases. The high relative speeds, extremely high temperatures and pressures also present seal design challenges in the turbines. In the past, designers have attempted to seal the interfaces of the rotating blade stages and stationary vane stages with varying degrees of success.

An example of such a turbine seal is a labyrinth seal. In a typical blade to vane interface, a multi-step labyrinth seal, comprising stationary lands and rotating runners or knife-edges, restricts leakage of the cooling air radially outward, into the combustion gases. The runners project from annular supports, which are typically fastened to the rotor with bolted flanges and/or with snap fits. The supports are independent components, adding to the manufacturing costs and complexity of the turbine. The supports also contribute additional rotational mass to the rotors, which reduces the engine-operating efficiency. Also, the attachments at the interfaces of the supports and the rotors create an additional leakage path for the cooling air. Placement of the supports is influenced by adjacent components and typically does not optimize the distribution of the cooling air.

What is needed is a blade to vane interface seal that doesn't require separate seal support components, and also improves the apportioning of cooling air to the seal itself.

BRIEF SUMMARY OF THE INVENTION

In accordance with the present invention, there are provided rotor to stator interface seals for restricting leakage of cooling air and improving the apportioning of the cooling air to the seals.

Accordingly, a turbine rotor contains a first and a second stage of circumferentially distributed blades. The blade stages are separated axially from one another by an annular coupling located radially inboard of the blades, forming a chamber therebetween. Interposed between the blade stages is a stationary vane stage. The vane stage contains a land, facing radially inwardly. A ring projects axially from each of the first and second blade stages towards the vane stage. The rings radially cooperate with the land and together form the blade to vane interface seal. The coupling contains an aperture for radially introducing cooling air to the chamber for use in cooling the seal.

In another embodiment of an interface seal in accordance with the present invention, a turbine rotor contains a first and a second stage of circumferentially distributed blades. The blade stages are separated axially from one another by an annular coupling located radially inboard of the blades, forming a chamber therebetween. Interposed between the blade stages is a stationary vane stage. The vane stage contains a radially inwardly facing land. A ring projects axially from blade stages towards the vane stage. The rings radially cooperate with the land. The coupling contains an integral ring projecting radially outward and radially cooperating with the land. Together, the cooperating rings and land form the blade to vane interface seal. The coupling also contains an aperture for radially introducing cooling air to the chamber for use in cooling the seal. Although the aperture may be located anywhere along the axial length of the coupling, it is typically located forward of the vane stage.

Since the sealing rings are integral with the existing blades and couplings of the gas turbine engine, separate supports are not needed and are therefore eliminated. The elimination of separate supports reduces the rotational mass of the rotors, thus improving engine-operating efficiency. Also, by relocating the rings to the blades, cooling air leakage paths are eliminated and the cooling air apportioning to the seal is improved.

Other details of the present invention, as well as other objects and advantages attendant thereto, are set forth in the following detailed description and the accompanying drawings wherein like reference numerals depict like elements.

BRIEF DESCRIPTION OF THE SEVERAL VIEWS OF THE DRAWINGS

FIG. 6a illustrates a front view of a ring segment interface comprising a single chamfered edge.

FIG. 6b illustrates a front view of a ring segment interface comprising double chamfered edges.

FIG. 6c illustrates a front view of a ring segment interface comprising a single sloped edge.

FIG. 6d illustrates a front view of a ring segment interface comprising dual sloped edges.

FIG. 6e illustrates a front view of a ring segment interface comprising tangentially sloped wings.

FIG. 6f illustrates a front view of a ring segment interface comprising a single downstream dam.

FIG. 6g illustrates a front view of a ring segment interface comprising dual dams.

DETAILED DESCRIPTION OF THE INVENTION

Figure 1:
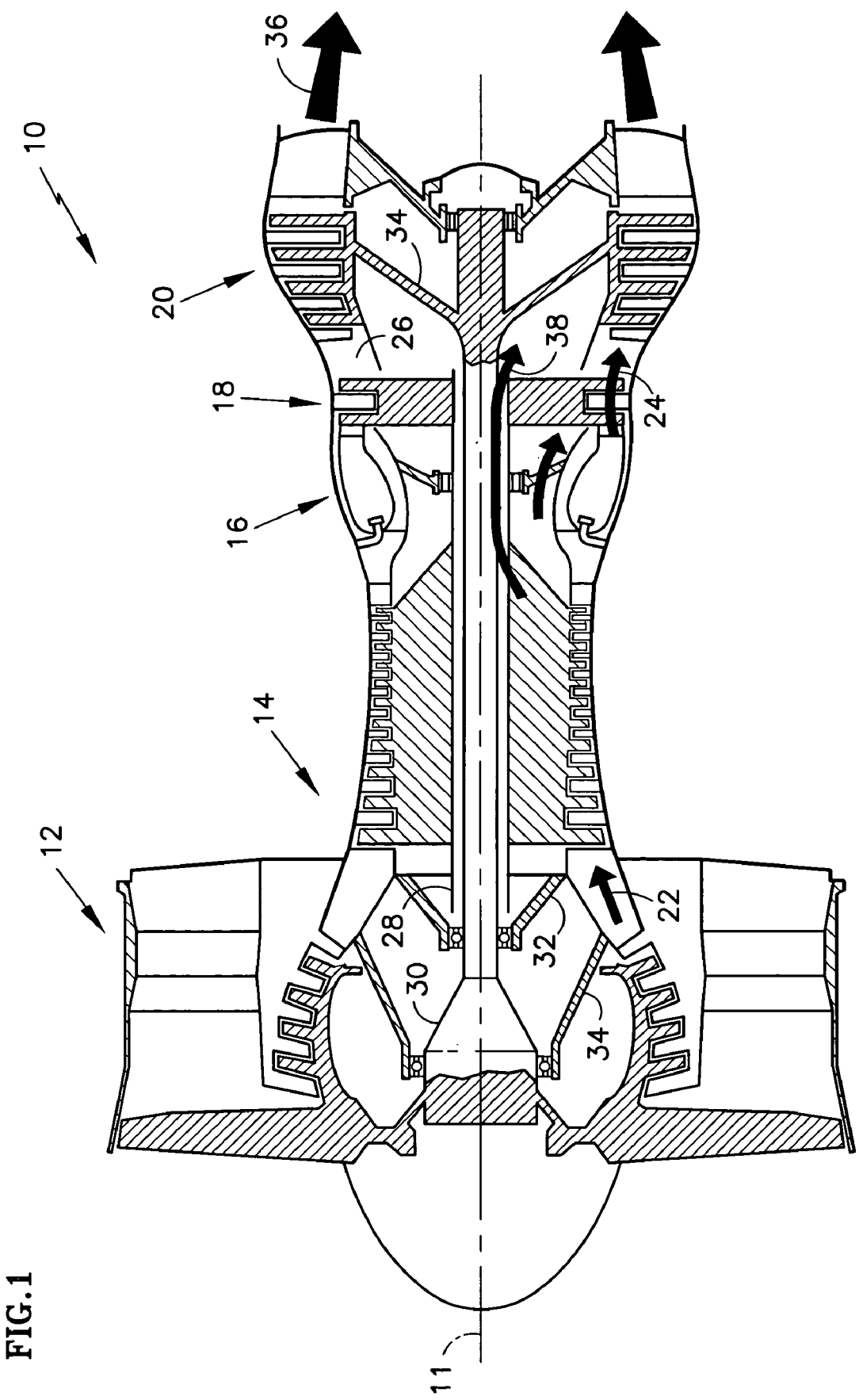
FIG. 1 illustrates a simplified schematic sectional view of a gas turbine engine along a central, longitudinal axis.

The major sections of a typical gas turbine engine 10 of FIG. 1 include in series, from front to rear and disposed about a central longitudinal axis 11, a low-pressure compressor 12, a high-pressure compressor 14, a combustor 16, a high-pressure turbine 18 and a low-pressure turbine 20. A working fluid 22 is directed rearward through the compressors 12, 14 and into the combustor 16, where fuel is injected and the mixture is burned. Hot combustion gases 24 exit the combustor 16 and expand within an annular duct 26, driving the turbines 18, 20. The turbines 18, 20, in turn drive coupled compressors 14, 12 via concentric shafts 28, 30, forming a high rotor spool 32 and a low rotor spool 34 respectively. Although a dual spool engine 10 is depicted in the figure, three spool engines 10 are not uncommon. The combustion gases exit the engine 10 as a propulsive thrust 36, used to power an aircraft or a free turbine. A portion of the working fluid 22 is bled from the compressors 12, 14 and is directed radially inward of the combustor 16 and axially rearward to the turbines 18, 20 for use as cooling air 38.

Figure 2:
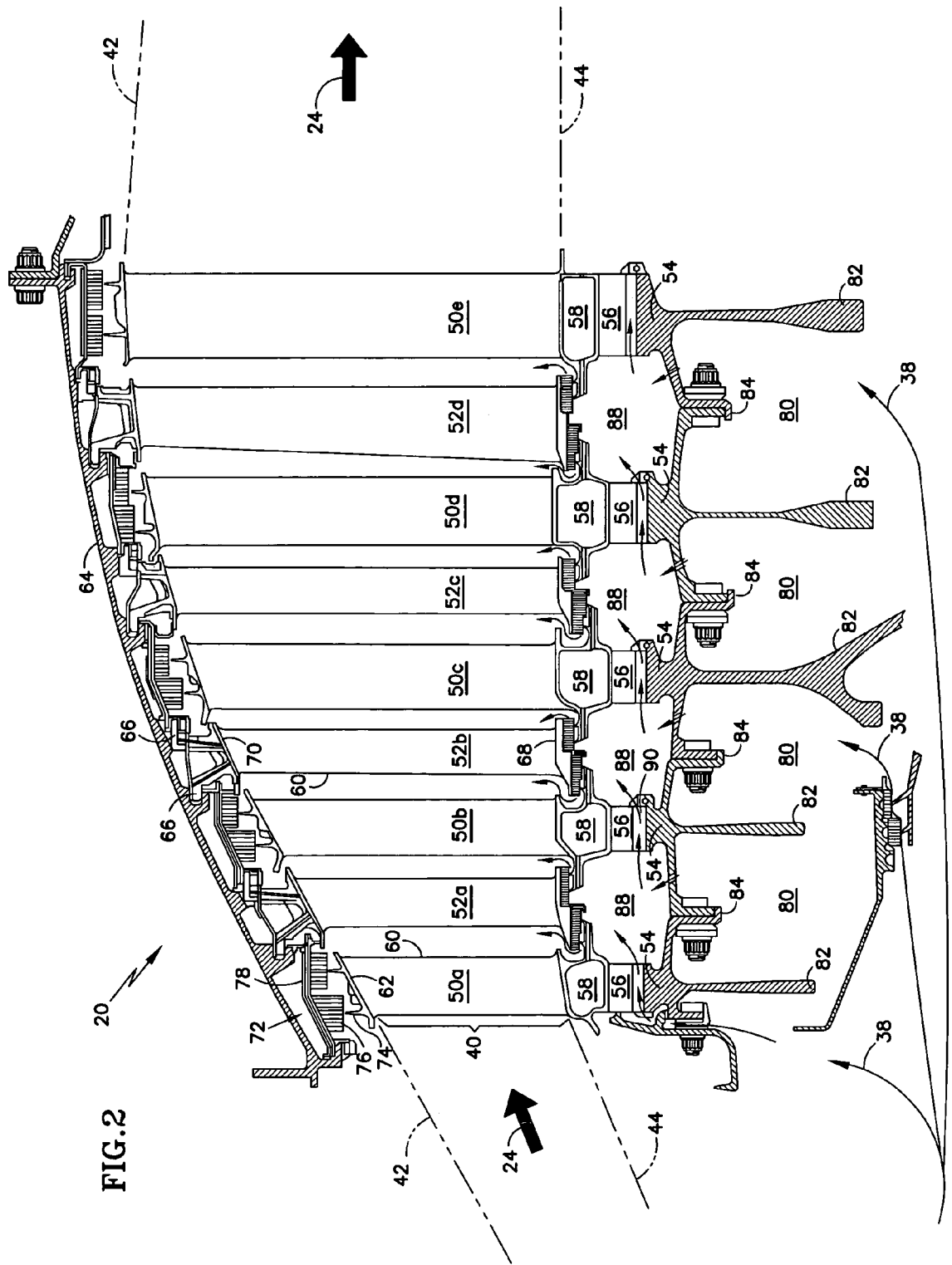
FIG. 2 illustrates a partial sectional view of a low-pressure turbine of the type used in the engine of FIG. 1.
Figure 3:
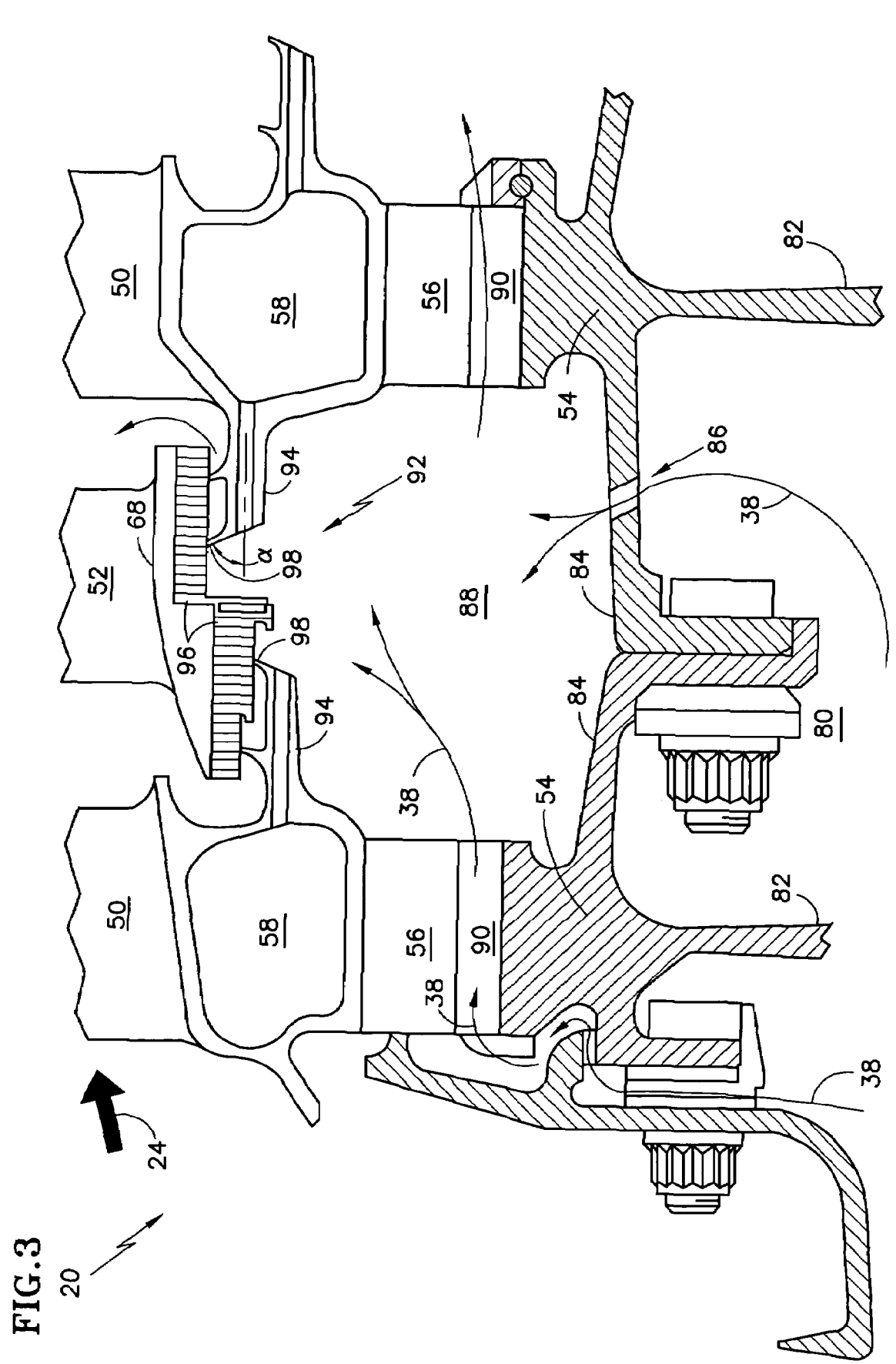
FIG. 3 illustrates a detailed sectional view of a blade to vane interface seal embodiment of the type used in the turbine of FIG. 2.
Figure 4:
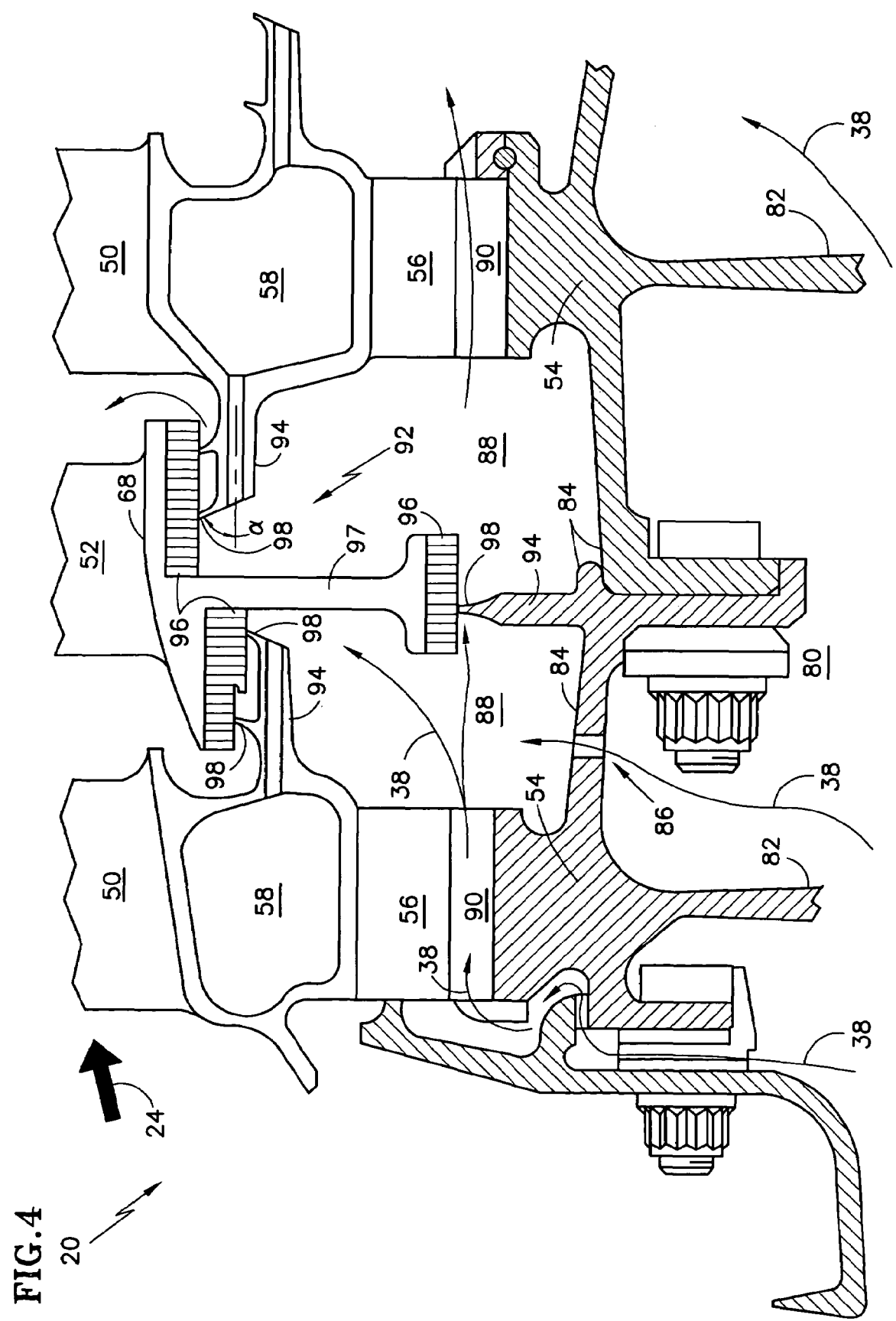
FIG. 4 illustrates a detailed sectional view of another blade to vane interface seal embodiment of the type used in the turbine of FIG. 2.

In an exemplary low-pressure turbine 20 of FIGS. 2-4, the combustion gases 24 are directed rearward through an annular duct 40 approximately defined by a radially outer flow path 42 and a radially inner flow path 44. Disposed circumferentially within the annular duct 40 are alternating stages of rotating blades 50a-50e and stationary vanes 52a-52d. The blades 50 extend radially outward from a rotor disk 54 by roots 56 disposed radially inward of platforms 58. Each blade 50 further comprises an airfoil 60, extending radially between the platform 58 and an outer tip shroud 62. The airfoil 60 has a forward facing leading edge and a rearward facing trailing edge. In some instances, the blades 50 are removable from the disks 54 and in some instances non-removable. The vanes 52 are cantilevered inward from a case 64 by hooks 66 extending radially outward from the outer tip shrouds 62. Each vane 52 comprises an airfoil 60 that extends radially between an inner shroud 68 and an outer shroud 70.

Outer seals 72 restrict leakage of the combustion gases 74 at the outer flow path 42. The outer seals 72 are disposed at the interface of the rotating blades 50 and the stationary case 64. The tip shrouds 62 contain outwardly extending runners 74 that radially cooperate with inwardly facing lands 76 affixed to the case 64 by supports 78. The radial cooperation of the runners 74 and the lands 76, along with the rotation of the blades 50, cause a damming effect and thus restricts leakage of the combustion gases 24 from the outer flow path 42. Overlapping platforms 58 and a constant supply of higher pressure cooling air 38 restrict leakage of the combustion gases 24 at the inner flow path 44.

Cooling air 38, bled from the compressors 12, 14 is directed to bore cavities 80. The bore cavities 80 are bounded axially by adjacent disk bores 82 and radially outwardly by an annular coupling 84. The coupling 84 joins adjacent disks 54 with bolts, rivets, welds, threads, splines, tapers, snap fits, or other means. The coupling 84 may also be integrally formed with each of the adjacent disks 82 (not shown). The cooling air 38 is pumped radially outward, against the couplings 84, by the rotation of the disks 54. Apertures 86 in the couplings 84 direct the cooling air 38 into rim cavities 88. The apertures may be circular holes, slots, or other forms and are typically, evenly distributed cirumferentially about the coupling 84. The apertures 86 are sized to allow the appropriate cooling air 38 volume to enter the rim cavity 88.

The cooling air 38 inside the rim cavity 88 is maintained at a higher pressure than the combustion gases 24 in the annular duct 40 under all engine-operating conditions. The higher pressure cooling air 38 prevents combustion gas 24 ingestion into the rim cavities 88 and provides cooling for the blade 50 to vane 52 interface. A portion of the cooling air 38 is directed axially rearward through a plurality of slots 90 disposed between the blade roots 56 and the disk 54. This portion of cooling air 38 reduces the temperature of the blade root 56 to disk 54 interface before being directed axially rearward to a downstream rim cavity 88. Another portion of the cooling air 38 is directed radially outward to cool the blade 50 to vane 52 interface region.

As specifically illustrated in FIGS. 3 and 4, seals 92 according to various embodiments of the current invention restrict the leakage of the cooling air 38 at the interfaces of the blades 50 and vanes 52. The blade platforms 58 form one or more circumferentially segmented rings 94 that radially cooperate with inwardly facing lands 96 affixed to the vanes 52. Also, one or more integral rings 94 may project radially outward from coupling 84 anywhere along its axial length as specifically illustrated in FIG. 4. The cooperation of the integral rings 94 and lands 96 form intermediate seals, which partition cavity 88 into two or more smaller cavities 88. The radially outward projecting ring 94 is not segmented and also radially cooperates with a land 96 affixed to a vane 52. The proximate radial position of the rings 94 and the lands 96, along with the rotation of the blades 50, cause a damming effect and thus restrict leakage of the cooling air 38 from the rim cavity 88.

The lands 96 may have a constant radial profile or may be stepped radially to further prevent ingestion of the combustion gases 24 into the rim cavity 88. A land 96 may be affixed directly to the vane 52 by brazing, welding or other suitable means or may be affixed to a support 97 projecting radially inwardly from the vane 52. The support 97 may be integrated with the vane 52 or may be affixed by brazing, welding or other suitable means. A land 96 is typically comprised of a honeycomb shaped, sheet metal structure, or any other structure and material known in the sealing art to restrict leakage.

The rings 94 project axially from a platform 58 of a blade 50 in a leading edge direction, a trailing edge direction, or both directions. An integral ring 94 may also project radially from coupling 84. With the blades 50 assembled into a disk 54, individual ring 94 segments axially and radially align, to form a substantially complete ring 94 about central axis 11.

A ring 94 may contain one or more radially extending runners 98, which are also known as knife-edges. The addition of multiple runners 98 provides a greater cooling air 38 leakage restriction, but the actual number may be dictated by space and/or weight limitations. The width of a runner 98 should be as thin as possible, adjacent to a land 96, to reduce the velocity of any cooling air 38 flowing therebetween. Since intermittent contact between a runner 98 and a land 96 may occur, a coating, hardface or other wear-resistant treatment is typically applied to the runners 98. A runner 98 may also be canted at an angle (•) from between about 22.5 degrees to about 68 degrees, preferably 55 degrees, relative to the longitudinal axis of the segmented ring 94. By canting the runner 98 in the direction opposing the cooling air 38 flow, a damming effect is created, providing for an increased leakage restriction. Canting a runner 98 also reduces the length of the thicker, segmented ring 94, reducing weight even further. The rings 94 and runners 98 are formed by casting, conventional machining, electrodischarge machining, chemical milling, or any other suitable manufacturing methods.

Figure 5:
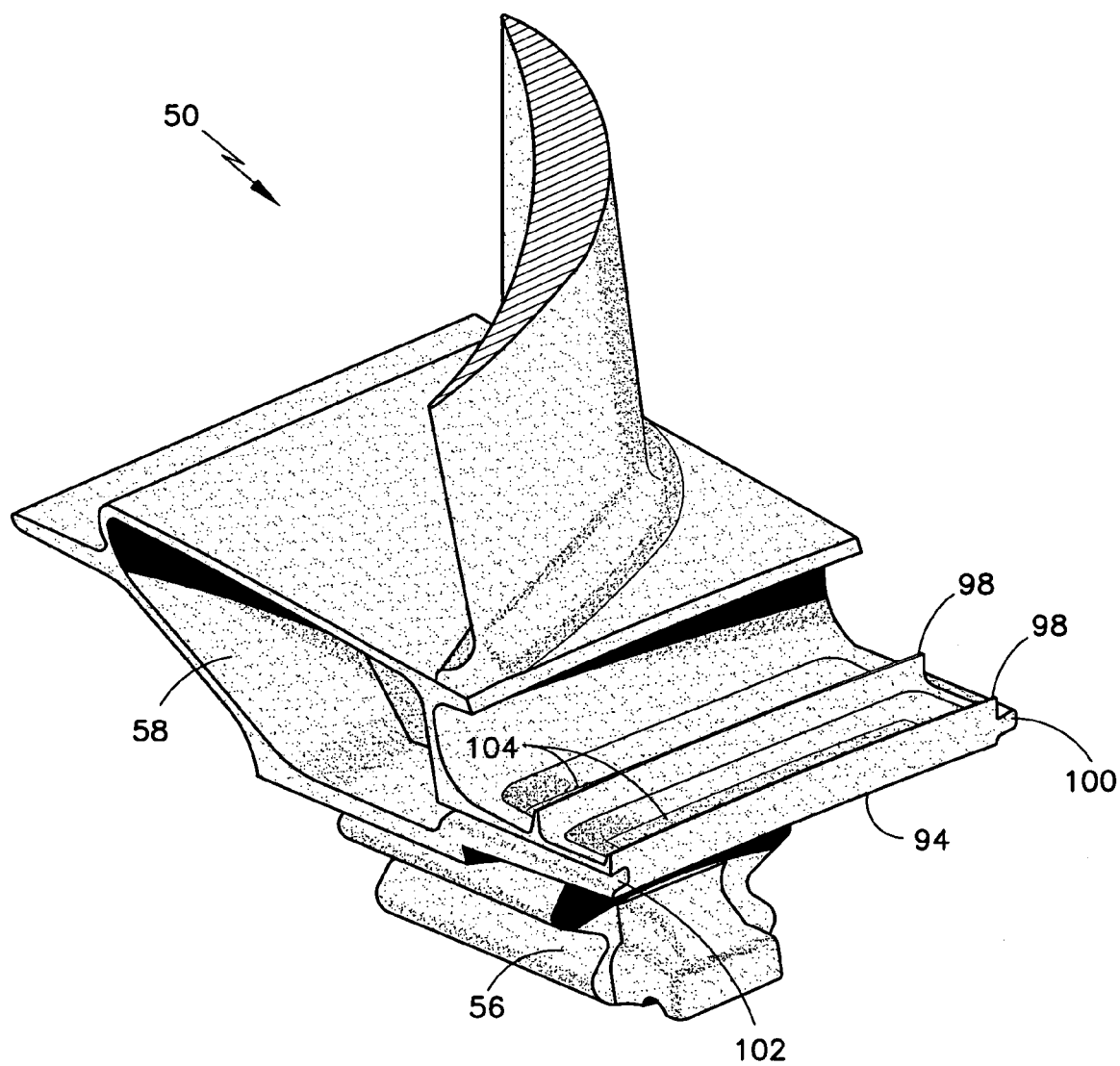
FIG. 5 illustrates an isometric view of a turbine blade of the type used in the turbine of FIG. 2.

As further illustrated by the blade 50 embodiment of FIG. 5, adjacent ring 94 segments may contain mechanical sealing elements to reduce leakage of cooling air 38 therebetween. With the blades 50 installed, a tongue 100 and a groove 102 cooperate between adjacent ring 94 segments to reduce leakage of the cooling air 38. It is noted that the tongue 100 may be inclined radially outward to ensure it completely contacts the groove 102 under centrifugal loading. Since an increased radial thickness of the ring 94 segment is only required to accommodate the tongue 100 and groove 102, one or more pockets 104 are typically located between the tongue 100 and groove 102 to reduce the rotational mass of the blade 50. The pockets 104 are formed by casting, conventional machining, electrodischarge machining, chemical milling or any other suitable manufacturing methods.

As illustrated in the ring 94 segment embodiments of FIGS. 6a-6g, adjacent ring 94 segments may contain aerodynamic sealing means to reduce leakage of cooling air 38 therebetween. By directing a volume of cooling air 38 and combustion gases 24 radially inward through the mechanism of reverse inward pumping, the radially outward leakage of cooling air 38 from the rim cavity 88 is opposed, and therefore reduced. In each of the figures, the reference rotation of the blades 50 is in the clockwise direction. If the rotation of the blades 50 is in the counterclockwise direction, the inventive aerodynamic sealing elements are mirrored about a plane extending through the longitudinal axis 11 of the engine 10. Also, the upstream ring 194 segment is illustrated to the right and the downstream ring 294 segment is illustrated to the left in each of the figures.

FIG. 6a illustrates a chamfered edge 106, reverse pumping element. The chamfered edge 106 is located at the intersection of a tangentially facing surface 108 and a radially outer surface 110 of the upstream ring 194 segment. A volume of cooling air 38 and combustion gases 24 encounters the chamfered edge 106 and is pumped radially inward, between adjacent ring 194, 294 segments, by the rotation of the blades 50. The inward pumping opposes the radially outward leakage of cooling air 38.

FIG. 6b illustrates a double chamfered edge 106, reverse pumping element. A chamfered edge 106 is located at the intersection of a tangentially facing surface 108 and a radially outer surface 110 of the upstream ring 194 segment. Also, a chamfered edge 106 is located at the intersection of a tangentially facing surface 108 and a radially inner surface 112 of the downstream ring 294 segment. A volume of cooling air 38 and combustion gases 24 encounters the chamfered edges 106 and is pumped radially inward, between adjacent ring 194, 294 segments, by the rotation of the blades 50. The inward pumping opposes the radially outward leakage of cooling air 38.

FIG. 6c illustrates a single sloped edge 114, reverse pumping element. A sloped edge 114 is located between a radially outer surface 110 and a radially inner surface 112 of the upstream ring 194 segment. A volume of cooling air 38 and combustion gases 24 encounters the sloped edge 114 and is pumped radially inward, between adjacent ring 194, 294 segments, by the rotation of the blades 50. The inward pumping opposes the radially outward leakage of cooling air 38.

FIG. 6d illustrates a dual sloped edge 114, reverse pumping element. A sloped edge 114 is located between a radially outer surface 110 and a radially inner surface 112 of the upstream ring 194 segment. Also, a sloped edge 114 is located between a radially outer surface 110 and a radially inner surface 112 of the downstream ring 194 segment. A volume of cooling air 38 and combustion gases 24 encounters the sloped edges 114 and is pumped radially inward, between adjacent ring 194, 294 segments, by the rotation of the blades 50. The inward pumping opposes the radially outward leakage of cooling air 38.

FIG. 6e illustrates a dual tangentially sloped wing 116, reverse pumping element. A radially inner sloped wing 116 is located adjacent the tangentially facing surface 108 of the upstream ring 194 segment. Also, a radially outer sloped wing 116 is located adjacent the tangentially facing surface 108 of the downstream ring 294 segment. A volume of cooling air 38 and combustion gases 24 encounters the wings 116 and is pumped radially inward, between adjacent ring 194, 294 segments, by the rotation of the blades 50. The inward pumping opposes the radially outward leakage of cooling air 38.

FIG. 6f illustrates a single downstream dam 118, reverse pumping element. The tangentially facing surface 108 of the downstream ring 294 segment is radially thickened and protrudes radially outward, beyond the tangentially facing surface 108 of the upstream ring 194 segment to form the dam 118. A volume of cooling air 38 and combustion gases 24 encounters the dam 118 and is pumped radially inward, between adjacent ring 194, 294 segments, by the rotation of the blades 50. The inward pumping opposes the radially outward leakage of cooling air 38.

FIG. 6g illustrates a dual dam 118, reverse pumping feature. The tangentially facing surface 108 of the downstream ring 294 segment is radially thickened and protrudes radially outward, beyond the tangentially facing surface 108 of the upstream ring 194 segment. Also, the tangentially facing surface 108 of the upstream ring 194 segment is radially thickened and protrudes radially inward, beyond the tangentially facing surface 108 of the downstream ring 294 segment. A volume of cooling air 38 and combustion gases 24 encounters the dam and is pumped radially inward, between adjacent ring 194, 294 segments, by the rotation of the blades 50. The inward pumping opposes the radially outward leakage of cooling air 38.

Although a low-pressure turbine 20 is illustrated throughout the figures for succinctness, it is understood that high-pressure and mid-pressure turbines are similarly constructed and would therefore benefit from the exemplary seals 92 and rim cavity 88 cooling arrangements.

While the present invention has been described in the context of specific embodiments thereof, other alternatives, modifications and variations will become apparent to those skilled in the art having read the foregoing description. Accordingly, it is intended to embrace those alternatives, modifications and variations as fall within the broad scope of the appended claims.

What is claimed is:

1. An interstage seal comprising:
 a first rotor stage containing a plurality of outwardly extending blades;
 a second bladed rotor stage containing a plurality of outwardly extending blades, said second stage spaced axially from said first stage;
 a vane stage interposed between said rotor stages, said vane stage containing at least one radially inwardly directed land;
 wherein each of said bladed rotor stages contains at least one ring projecting from a platform of said first and second rotor stage of blades, said rings radially cooperating with said at least one land to form the seal;
 wherein each ring is segmented circumferentially and each blade contains one segment of the ring;
 and wherein each segment of the ring contains a tongue and a groove and wherein the tongue and the groove of adjacent ring segments cooperate when installed.

2. The seal of claim 1 wherein each ring segment contains a pocket located circumferentially between said tongue and said groove.

3. The seal of claim 1 wherein each ring segment contains an aerodynamic sealing means.

4. A turbine blade comprising:
 a radially innermost attachment for engaging a rotor;
 a platform disposed radially outward from said attachment;
 an airfoil extending radially outward from said platform;
 at least one ring segment protruding axially from said platform; and
 wherein said ring segments contain a tongue and a groove.

5. The blade of claim 4 wherein said tongue is inclined in the outward radial direction.

6. The blade of claim 4 wherein said ring segments contain a pocket disposed circumferentially between said tongue and said groove.

7. The seal of claim 6 wherein said ring segments contain an aerodynamic sealing means.

8. A cooled rotor to stator interface seal for a gas turbine engine comprising:
 a first rotor stage containing a first disk and a plurality of first blades extending radially outward from said first disk;
 a second rotor stage containing a second disk and a plurality of second blades extending radially outward from said second disk, said first and second stages being spaced apart to form a chamber therebetween, said disks being joined by an axially spanning, annular coupling disposed radially inboard of said blades;
 a vane stage interposed between said first and second rotor stages, said vane stage containing at least one radially inwardly facing land;
 a ring projecting axially from each of said first and second blades and radially cooperating with the at least one land to form the seal; and
 at least one aperture through said coupling for radially introducing a cooling fluid to said chamber for use in cooling the seal.

9. The seal of claim 8 further comprising a plurality of apertures an said first disk for delivering a pressurized fluid into said chamber.

10. The seal of claim 9 further comprising a plurality of apertures in said second disk for removing a portion of the pressurized fluid from said chamber.

11. The seal of claim 9 wherein each ring contains exactly two runners.

12. The seal of claim 11 wherein each runner is canted at an angle towards the vane stage.

13. The seal of claim 12 wherein each runner is canted at an angle of between 22.5 degrees and 68 degrees in relation to said ring.

14. The seal of claim 13 wherein each runner is canted at an angle of 55 degrees in relation to said ring.

15. The seal of claim 8 wherein each of the rings contains a runner disposed radially between said ring and said land.

16. The seal of claim 8 wherein said rings are circumferentially segmented.

17. The seal of claim 16 wherein said ring segments contain a tongue and a groove.

18. The seal of claim 17 wherein each tongue is inclined in the outward radial direction.

19. The seal of claim 18 wherein said ring segments contain at least one pocket disposed circumferentially between said tongue and said groove.

20. The seal of claim 16 wherein said ring segments contain an aerodynamic sealing means.

21. The seal of claim 8 wherein a land is located radially inward of another land.

22. The seal of claim 8 wherein said coupling further comprises a ring protruding radially outward, said ring radially cooperating with the at least one land to form a portion of the seal.

23. The seal of claim 22 wherein said at least one aperture is disposed axially forward of said vane stage.

* * * * *